United States Patent
Butler et al.

(10) Patent No.: US 8,653,187 B2
(45) Date of Patent: Feb. 18, 2014

(54) USE OF NANO ALUMINA OR SILICA DISPERSED IN POLYSTYRENE

(75) Inventors: James R. Butler, Spicewood, TX (US); David W. Knoeppel, League City, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 13/306,097

(22) Filed: Nov. 29, 2011

(65) Prior Publication Data

US 2013/0137808 A1 May 30, 2013

(51) Int. Cl.
*C08L 25/04* (2006.01)

(52) U.S. Cl.
USPC .......... 524/855; 524/779; 524/786; 524/789; 524/847; 524/849

(58) Field of Classification Search
None
See application file for complete search history.

(56) References Cited

U.S. PATENT DOCUMENTS

| | | | |
|---|---|---|---|
| 4,777,210 A | | 10/1988 | Sosa et al. |
| 5,418,065 A | * | 5/1995 | Fujiki et al. .................... 428/451 |
| 5,750,258 A | * | 5/1998 | Sakai et al. .................... 428/405 |
| 6,489,500 B2 | * | 12/2002 | Bowman et al. ............... 556/469 |
| 7,179,873 B2 | | 2/2007 | Reimers et al. |
| 7,264,669 B1 | * | 9/2007 | Tomasino et al. ........ 106/287.11 |
| 2008/0038176 A1 | * | 2/2008 | Duguet et al. ............. 423/328.1 |
| 2008/0057130 A1 | * | 3/2008 | Brotzman ...................... 424/490 |
| 2009/0258977 A1 | * | 10/2009 | Smetana ....................... 524/100 |

OTHER PUBLICATIONS

"Thermal Stabilities of Polystyrene/silica Hybrid Nanocomposites via Microwave-assisted In Situ Polymerization" authored by Liu et al. and published in Materials Chemistry and Physics (2005) 84, 412-416.*

"Self-assembly of Functional Silanes onto Silica Nanoparticles" authored by Peng et al. and published in the Chinese Journal of Chemical Physics (2003) 16(6), 481-485.*

"Intercalation and Exfoliation: A Review on Morphology of Polymer Nanocomposites Reinforced by Inorganic Layer Structures" authored by Liu et al. and published in Materials and Manufacturing Processes (2006) 20, 143-151.*

M. Mortezael, et al., Influence of the Particle Size on the Viscoelastic Glass Transition of Silica-Filled Polystyrene, Journal of Applied Polymer Science, 2010, vol. 115, pp. 969-975.

* cited by examiner

*Primary Examiner* — Marc Zimmer

(57) ABSTRACT

Disclosed is a method of making a polystyrene based nanocomposite by combining a monomer with a nanoparticle to form a mixture and subjecting the mixture to polymerization conditions to produce a polymeric composite. In an embodiment the nanoparticle has been treated with an additive prior to combining with the monomer and the additive contains a silane moiety.

35 Claims, No Drawings

USE OF NANO ALUMINA OR SILICA DISPERSED IN POLYSTYRENE

FIELD

Embodiments of the present invention generally relate to polystyrene. In particular, embodiments of the invention relate to incorporating a layered compound such as clay nanoplatelets, aluminas and silicas into polystyrene.

BACKGROUND

In general, a high quality packaging material is one that creates a good oxygen and moisture barrier. Packaged goods are intended to last longer typically by reducing their interaction with oxygen and water, which usually can deteriorate the product causing waste and other problems. Polymeric materials are often used as packaging materials because they create a good oxygen/moisture barrier and their appearance and shape can be easily controlled. Plastic materials are also used in place of glass for bottling because they are lighter, are more resistant to breakage when dropped, and can be less expensive. Several common polymeric materials used for packaging as well as other uses are polyethylene (PE), polyethylene terephthalate (PET), polypropylene (PP), polycarbonate (PC), and polystyrene (PS).

Polystyrene is one of the largest volume thermoplastic resins in commercial production today. It is a hydrocarbon chain containing a phenyl group on every other carbon atom. Polystyrene is a durable polymer that is frequently encountered in daily life. A few common examples of polystyrene are plastic toys, computer housings, foam packaging, foam cups, food storage containers, etc.

Polymer nanocomposites comprise polymeric materials and inorganic compounds. When these inorganic components are properly incorporated into a polymer matrix, improvements in physical and mechanical properties can be displayed. The extent of uniformity of distribution of the inorganic compounds incorporated into the polymer matrix influences the characteristics of the nanocomposite.

Also, polystyrene is often times not suitable in certain environments. For example, polystyrene is typically not used in certain heated environments, such as microwave ovens, and may succumb to heat generated therein. It would be desirable to obtain a polystyrene composition that can have higher heat stability and/or higher heat distortion temperatures.

SUMMARY

An embodiment of the present invention is a nanocomposite comprising a polystyrene based polymer and a nanoparticle, which can be a treated nanoparticle formed by contacting a nanoparticle with an additive prior to combining with the monomer; wherein the nanoparticle is selected from the group consisting of silica, alumina, and combinations thereof.

In an embodiment, either by itself or in combinations with other embodiments, the polystyrene based polymer and a treated or untreated nanoparticle are combined in a melt blend.

In an embodiment, either by itself or in combinations with other embodiments, the polystyrene based polymer is formed by the polymerization of at least one monomer and the treated nanoparticle are combined with the at least one monomer prior to polymerization.

In an embodiment, either by itself or in combinations with other embodiments, the additive comprises a silane moiety.

In an embodiment, either by itself or in combinations with other embodiments, the additive is an alkoxy compound such as an alkoxy, dialkoxy, trialkoxy, etc., that can include methyl, ethyl, etc., that has an R group attached, wherein the R group is chosen from the group an alkane, an aromatic, and a vinyl group.

In an embodiment, either by itself or in combinations with other embodiments, the additive is trimethoxysilane that has an R group attached, wherein the R group is chosen from the group an alkane, an aromatic, and a vinyl group.

In an embodiment, either by itself or in combinations with other embodiments, the additive is trimethoxysilane that becomes at least a dimethyloxysilane having one methoxy reacted with an OH group to chemically bind the silane to the nanomaterial surface.

In an embodiment, either by itself or in combinations with other embodiments, the additive comprises a moiety that is capable of adsorbing volatile components from the polystyrene composite In an embodiment, either by itself or in combinations with other embodiments, the nanocomposite has a glass transition temperature of at least 2° C. above the glass transition temperature of the polystyrene based polymer without the treated nanoparticle.

In an embodiment, either by itself or in combinations with other embodiments, the nanocomposite has a glass transition temperature of at least 5° C. above the glass transition temperature of the polystyrene based polymer without the treated nanoparticle.

In an embodiment, either by itself or in combinations with other embodiments, the nanocomposite has a glass transition temperature of at least 115° C.

In an embodiment, either by itself or in combinations with other embodiments, the nanoparticle is present in an amount of from 0.001 wt % to 50 wt % of the nanocomposite.

In an embodiment, either by itself or in combinations with other embodiments, the nanoparticle comprises nano sized crystals in a micron sized cluster morphology that at least partially disperses into nanoparticles during the melt blend with the polystyrene based polymer and treated nanoparticle.

In an embodiment, either by itself or in combinations with other embodiments, the nanoparticle comprises nano sized crystals in a micron sized cluster morphology that at least partially disperses into nanoparticles during polymerization of at least one monomer.

An embodiment of the present invention includes an article produced from the nanocomposite.

An embodiment of the present invention is a method for production of a polymeric composite that includes combining a monomer with a nanoparticle, or clusters made of nano crystals, to form a mixture and subjecting the mixture to polymerization conditions to produce a polymeric composite. In an embodiment the nanoparticle is present in an amount of from 0.001 wt % to 50 wt % of the mixture.

In an embodiment, either by itself or in combinations with other embodiments, the polymeric composite includes a styrenic polymer that optionally includes one or more copolymers or comonomers. The polymeric composite can have an intercalated morphology, an exfoliated morphology, or both.

In an embodiment, either by itself or in combinations with other embodiments, the nanoparticle comprises silica or alumina. In an embodiment, either by itself or in combinations with other embodiments, the nanoparticle is a treated nanoparticle formed by contacting a nanoparticle with an additive prior to combining with the monomer. In an embodiment, either by itself or in combinations with other embodiments, the additive comprises a silane moiety.

In an embodiment, either by itself or in combinations with other embodiments, the additive is trimethoxysilane that becomes at least a dimethyloxysilane having one methoxy reacted with an OH group to chemically bind the silane to the nanomaterial surface.

In an embodiment, either by itself or in combinations with other embodiments, the additive is trimethoxysilane that has an R group attached, wherein the R group is chosen from the group an alkane, an aromatic, and a vinyl group.

In an embodiment, either by itself or in combinations with other embodiments, the nanoparticles increase the glass transition temperature of the polymeric composite to temperatures of at least 2° C. above the glass transition temperature the polymeric composite without the nanoparticles, optionally at least 5° C. above the glass transition temperature the polymeric composite without the nanoparticles, optionally at least 10° C. above the glass transition temperature the polymeric composite without the nanoparticles, optionally to at least 115° C.

In an embodiment, either by itself or in combinations with other embodiments, the nanoparticles increase the heat stability and/or Vicat of the polymeric composite.

An embodiment of the present invention includes an article produced from the polymeric composite.

The various embodiments of the present invention can be joined in combination with other embodiments of the invention and the listed embodiments herein are not meant to limit the invention. All combinations of various embodiments of the invention are enabled, even if not given in a particular example herein.

DETAILED DESCRIPTION

Disclosed herein are polymer composites containing one or more nanoparticles and one or more polymeric materials and methods of making and using the same. The polymer composite is a nanocomposite, and herein "nanocomposites" refer to materials that are created by introducing nanoparticles into a macroscopic material (e.g., polymeric material), which is commonly referred to as the matrix. According to the embodiments of the invention, the polymer composite comprises a nanocomposite having nanoparticulates and a polymer matrix.

The incorporation of inorganic fillers, such as nanoparticles of silica and/or alumina, may reduce polystyrene chain relaxation upon reheating by constraining the flexible chains within the stiff inorganic layers. Thus, silica and/or alumina based nanocomposites may improve polystyrene by increasing the glass transition of the polystyrene or its dimensional stability when subjected to higher temperatures. Also, the silica and/or alumina based nanocomposites may improve the microwavability of the polystyrene. Also, the silica and/or alumina based nanocomposites may improve the dimensional stability of the polystyrene, such as with an increased Vicat value or increase the heat stability of the polymeric composite.

The nanoparticles may also include nanoparticulate material. As used herein, the term "nanoparticulate" includes any particulate material having a dimension of less than 250 ηm. The nanoparticulate material may be selected from silica and/or alumina. The silica and/or alumina may be chosen from high purity silica and/or alumina, respectively. In an embodiment, the nanoparticulate material may include coarse silica and/or alumina powders. In another embodiment, the nanoparticulate material may include high purity alumina such as DISPERAL®, DISPAL®, PURAL®, CATAPAL®, PURALOX®, CATALOX®, each commercially available from Sasol North America, Inc. In a further embodiment, the nanoparticulate material may include nanoparticulates of silica-alumina.

The nanoparticulate material may be selected from the group of silica, alumina, and silica-alumina and any other combinations thereof. In an embodiment, the nanoparticulates may have at least one dimension ranging from 1 to 250 ηm. In another embodiment, the nanoparticulates may have at least one dimension ranging from 10 to 100 ηm.

In embodiments of the invention, the nanoparticle may be present in the nanocomposite in an amount ranging from 0.001 to 50 wt. % based on the total weight of the nanocomposite, alternatively from 0.5 to 25 wt. %, or from 1 to 10 wt. %.

In accordance with the invention, the nanocomposite comprises a polystyrene based polymer. The polymer may be present in the nanocomposite in an amount ranging from 50 to 99.9 wt. %, or from 90 to 99.5 wt. %, or from 95 to 99 wt. % based on the total weight of the nanocomposite.

In an embodiment, the polystyrene based polymer can be formed from monomers having a phenyl group. More specifically, the polymer can be formed from monomers having an aromatic moiety and an unsaturated alkyl moiety. Such monomers may include monovinylaromatic compounds such as styrene as well as alkylated styrenes wherein the alkylated styrenes are alkylated in the nucleus or side-chain. Alphamethyl styrene, t-butylstyrene, p-methylstyrene, acrylic and methacrylic acids or substituted esters of acrylic or methacrylic acid, and vinyl toluene are suitable monomers that may be useful in forming a polystyrene based polymer of the invention. These monomers are disclosed in U.S. Pat. No. 7,179,873 to Reimers et al., which is incorporated by reference in its entirety.

The polystyrene based polymer component in the nanocomposite can be a styrenic polymer (e.g., polystyrene), wherein the styrenic polymer may be a homopolymer or may optionally comprise one or more comonomers. Styrene, also known as vinyl benzene, ethenylbenzene, phenethylene and phenylethene is an aromatic organic compound represented by the chemical formula $C_8H_8$. Styrene is widely commercially available and as used herein the term styrene includes a variety of substituted styrenes (e.g. alpha-methyl styrene), ring substituted styrenes such as p-methylstyrene, distributed styrenes such as p-t-butyl styrene as well as unsubstituted styrenes.

In an embodiment, the styrenic polymer has a melt flow as determined in accordance with ASTM D1238 of from 1.0 g/10min to 100.0 g/10min, alternatively from 1.5 g/10min to 50.0 g/10min, alternatively from 2.0 g/10min to 15.0 g/10 min; a density as determined in accordance with ASTM D1505 of from 1.04 g/cc to 1.15 g/cm$^{33}$, alternatively from 1.05 g/cm$^3$ to 1.10g/cc, alternatively from 1.05 g/cm$^3$ to 1.07 g/cm$^3$, a Vicat softening point as determined in accordance with ASTM D1525 of from 227° F. to 180° F., alternatively from 224° F. to 200° F., alternatively from 220° F. to 200° F.; and a tensile strength as determined in accordance with ASTM D638 of from 4000 psi to 7800 psi. Examples of styrenic polymers suitable for use in this disclosure include without limitation PS525, PS529 and PS535, which are polystyrenes commercially available from Total Petrochemicals USA, Inc In some embodiments, the styrenic polymer or polystyrene based polymer further comprises a comonomer which when polymerized with styrene monomer forms a styrenic copolymer. Examples of such copolymers may include for example and without limitation α-methylstyrene; halogenated styrenes; alkylated styrenes; acrylonitrile; esters of methacrylic acid with alcohols having 1 to 8 carbons; N-vinyl compounds such as vinylcarbazole and maleic anhydride; compounds which contain two polymerizable double bonds such as for example and without limitation divinylbenzene or butanediol diacrylate; or combinations thereof. The comonomer may be present in an amount effective to impart one or more user-desired properties to the composition. Such effective amounts may be determined by one of ordinary skill in the art with the aid of this disclosure. For example, the comonomer may be present in a styrene monomer containing reaction mixture to be polymerized in an amount ranging from 0.1 to 99.9 wt. % by total weight of the reaction mixture, alternatively from 1 to 90 wt. %, and further alternatively from 1 to 50 wt. %.

In an embodiment, the polymer or polystyrene based polymer also comprises a thermoplastic material. Herein a thermoplastic material refers to a plastic that melts to a liquid when heated and freezes to form a brittle and glassy state when cooled sufficiently. Examples of thermoplastic materials include without limitation acrylonitrile butadiene styrene, celluloid, cellulose acetate, ethylene vinyl acetate, ethylene vinyl alcohol, fluoroplastics, ionomers, polyacetal, polyacrylates, polyacrylonitrile, polyamide, polyamide-imide, polyaryletherketone, polybutadiene, polybutylene, polybutylene terephthalate, polychlorotrifluoroethylene, polyethylene terephthalate, polycyclohexylene dimethylene terephthalate, polycarbonate, polyetherimide, polyethersulfone, polyethylenechlorinate, polyimide, polylactic acid, polymethylpentene, polyphenylene oxide, polyphenylene sulfide, polyphthalamide, polypropylene, polysulfone, polyvinyl chloride, polyvinylidene chloride, and combinations thereof. For example, the thermoplastic material may be present in the nanocomposite in an amount ranging from 0.1 to 50 wt. % by total weight of the nanocomposite.

In an embodiment, the polymer or polystyrene based polymer comprises an elastomeric phase that is embedded in a polymer matrix. For instance, the polymer may comprise a styrenic polymer having a conjugated diene monomer as the elastomer. Examples of suitable conjugated diene monomers include without limitation 1,3-butadiene, 2-methyl-1,3-butadiene, and 2-chloro-1,3-butadiene. Alternatively, the thermoplastic may comprise a styrenic polymer having an aliphatic conjugated diene monomer as the elastomer. Without limitation, examples of suitable aliphatic conjugated diene monomers include $C_4$ to $C_9$ dienes such as butadiene monomers. Blends or copolymers of the diene monomers may also be used. Examples of thermoplastic polymers include without limitation acrylonitrile butadiene styrene (ABS), high impact polystyrene (HIPS), methyl methacrylate butadiene (MBS), and the like. The elastomer may be present in an amount effective to impart one or more user-desired properties to the composition. Such effective amounts may be determined by one of ordinary skill in the art with the aid of this disclosure. For example, the elastomer may be present in the styrenic polymer in an amount ranging from 0.1 to 50 wt. % by total weight of the styrenic polymer, or from 1 to 25 wt. %, or from 1 to 10 wt. %.

In accordance with the invention, the nanocomposite also optionally contains additives, as deemed necessary to impart desired physical properties. The additives used in the invention may be additives that modify silica and/or alumina. Additives suitable for use in the invention include without limitation compounds containing silane moieties. In an embodiment, the silane moieties may modify the nanoparticles by attaching to hydroxyl groups of the nanoparticles. In an embodiment a trimethoxysilane having an R group on it, such as an alkane, an aromatic, or a vinyl group, can become a dimethyloxysilane with one methoxy reacted with an OH group to chemically bind the silane to the nanomaterial surface.

The additives may contain compounds having silica and/or alumina that are capable of adsorbing unreacted monomers or other volatile components, such as dimers and trimers, in polystyrene. In an embodiment, the additives may contain compounds having moieties that are capable of compatibalizing the nanoparticle with the matrix to reduce the release of unreacted monomers or other volatile components in the polystyrene nanocomposite. In an embodiment at least a portion of any unreacted monomers or other volatile components in the polystyrene nanocomposite are bound by adsorption to the silica and/or alumina. In an embodiment the total volatiles are lowered to less than 200 ppm, optionally less than 100 ppm, optionally less than 50 ppm. In an embodiment the styrene monomer volatiles are lowered to less than 200 ppm, optionally less than 100 ppm, optionally less than 50 ppm.

In an embodiment, the additives may contain moieties that can serve to increase the surface area of the nanoparticles in order to increase the glass transition temperature of the polystyrene. In another embodiment, the additives may increase the surface area of the nanoparticles by amounts of at least 5%, optionally at least 10%. In another embodiment, the additives may increase the glass transition temperature of the polystyrene to temperatures that can be used in microwave applications. In another embodiment, the additives may increase the glass transition temperature of the polystyrene to temperatures of at least 2° C. above the glass transition temperature the polymeric composite without the nanoparticles, optionally at least 5° C. above the glass transition temperature the polymeric composite without the nanoparticles, optionally at least 10° C. above the glass transition temperature the polymeric composite without the nanoparticles, optionally to at least 115° C.

These additives may be included in amounts effective to impart desired physical properties. In an embodiment, the additive(s) are added to the nanoparticles in amounts ranging from 0.001 to 50 wt. % based on the total weight of the nanoparticles. In another embodiment, the additive(s) are included in amounts of from 0.01 to 40 wt. %. In another embodiment, the additive(s) are included in amounts of from 0.1 to 25 wt. %. In another embodiment, the additive(s) are included in amounts of from 0.1 to 10 wt. %. In another embodiment, the additive(s) are included in amounts of from 0.1 to 5 wt. %. In a further embodiment, the additive(s) are included in amounts of from 1 to 3 wt. %.

In an embodiment, a method for production of the styrenic polymer includes contacting styrene monomer and other components under proper polymerization reaction conditions. The polymerization process may be operated under batch or continuous process conditions. In an embodiment, the polymerization reaction may be carried out using a continuous production process in a polymerization apparatus comprising a single reactor or a plurality of reactors. In an embodiment of the invention, the polymeric composition can be prepared for an upflow reactor. Reactors and conditions for the production of a polymeric composition are disclosed in U.S. Pat. No. 4,777,210, to Sosa et al., which is incorporated by reference in its entirety.

The operating conditions, including temperature ranges, can be selected in order to be consistent with the operational characteristics of the equipment used in the polymerization process. In an embodiment, polymerization temperatures range from 88° C. to 238° C. (190° F. to 460° F.). In another embodiment, polymerization temperatures range from 93° C. to 182° C. (200° F. to 360° F.). In yet another embodiment, the polymerization reaction may be carried out in a plurality of reactors, wherein each reactor is operated under an optimum temperature range. For example, the polymerization reaction may be carried out in a reactor system employing a first and second polymerization reactors that are either both continuously stirred tank reactors (CSTR) or both plug-flow reactors. In an embodiment, a polymerization reactor for the production of a styrenic copolymer of the type disclosed herein comprising a plurality of reactors wherein the first reactor (e.g., a CSTR), also known as the prepolymerization reactor, operated in the temperature range of from 88° C. to 135° C. (190° F. to 275° F.) while the second reactor (e.g., CSTR or plug flow) may be operated in the range of 93° C. to 165° C. (200° F. to 330° F.).

The polymerized product effluent may be referred to herein as the prepolymer. When the prepolymer reaches a desired conversion, it may be passed through a heating device into a second reactor to achieve further polymerization. The polymerized product effluent from the second reactor may be further processed as desired or needed. Upon completion of the polymerization reaction, a styrenic polymer is recovered and subsequently processed, for example devolatized, pelletized, etc.

In accordance with the invention, the nanoparticles may be incorporated into the polymer/monomer at any stage of the polymerization process, for example, including without limitation before, during, or after the polymerization process. In an embodiment, the nanoparticles are incorporated by mixing of a monomer with the nanoparticles. For example, by the mixing of styrene monomer with silica and/or alumina prior to in situ polymerization. In another embodiment, the nanoparticles are incorporated by compounding the polymerized product with the nanoparticles. For example, compounding polystyrene with silica and/or alumina. In yet another embodiment, the nanoparticles are incorporated by solution mixing with a polymer, such as polystyrene, in a proper solvent, such as toluene or tetrahydrofuran. For example, solution mixing polystyrene with silica and/or alumina in toluene.

In an embodiment, an article can be obtained by subjecting the polymeric nanocomposite to a plastics shaping process such as foaming, sheet extrusion thermoforming, extrusion blow molding, extrusion coating, blow molding, injection blow molding, injection stretch blow molding, thermoforming, and the like. The polymeric nanocomposite may be formed into end use articles such as for example, packaging, office supplies, structural supports, laminate compositions, polymeric foam substrate, decorative surfaces, outdoor furniture, point-of-purchase signs and displays, housewares and consumer goods, building insulation, cosmetics packaging, outdoor replacement materials, lids and food/beverage containers, appliances, utensils, electronic components, automotive parts, enclosures, medical supplies, toys, piping, and the like.

Use of broader terms such as comprises, includes, having, etc. should be understood to provide support for narrower terms such as consisting of, consisting essentially of, comprised substantially of, etc.

The term "composite materials" refers to materials which are made from two or more constituent materials (e.g., a layered compound and a polymeric material) with significantly different physical and/or chemical properties and which remain separate and distinct on a macroscopic level within the finished structure.

The term "dispersed" refers to the distribution of particles or particulates and can refer to delamination of a layered material resulting in the formation of disordered layers or sheets. In one or more embodiments, the treated nanoparticle can be dispersed within the polystyrene matrix of the polystyrene composite, and can include delaminated layered particles or particulates distributed within the polystyrene matrix.

The term "nanocomposites" refers to materials that are created by introducing nanoparticles, also termed filler materials into a macroscopic material (e.g., a polymeric material), which is typically referred to as the matrix.

The term "nanoparticles" refers to particles having its largest dimension less than 100 nanometers ($\eta$m).

The term "nanoparticulates" refers to particulates, including coarse or round particles, having a diameter of less than 250 nanometers ($\eta$m).

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

The various aspects of the present invention can be joined in combination with other aspects of the invention and the listed embodiments herein are not meant to limit the invention. All combinations of various aspects of the invention are enabled, even if not given in a particular example herein.

While illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein. Other and further embodiments, versions and examples of the invention may be devised without departing from the basic scope thereof and the scope thereof is determined by the claims that follow.

What is claimed is:

1. A method for production of a polystyrene composite, comprising:
   combining a styrene monomer with a treated nanoparticle to form a mixture; and
   subjecting the mixture to polymerization conditions to produce a polystyrene composite;
   wherein the treated nanoparticle has been formed by contacting a nanoparticle with an additive to produce a treated nanoparticle prior to combining with the monomer;
   wherein the nanoparticle is selected from the group consisting of silica, alumina, and combinations thereof capable of adsorbing volatile components from the polystyrene composite;
   wherein the additive comprises a moiety that is capable of reacting with styrene from the polystyrene composite;
   wherein the glass transition temperature of the polystyrene composite is at least 2° C. above the glass transition temperature of the polystyrene based polymer without the treated nanoparticle;
   wherein the treated nanoparticle is dispersed within a polystyrene matrix of the polystyrene composite and comprises delaminated layered particles or particulates distributed within the polystyrene matrix; and
   wherein the polystyrene composite has an intercalated morphology, an exfoliated morphology, or combinations thereof.

2. The method of claim 1, wherein the additive comprises a silane moiety.

3. The method of claim 1, wherein the additive is an alkoxysilane compound that has an R group attached, wherein the R group is chosen from the group an alkane, an aromatic, and a vinyl group.

4. The method of claim 1, wherein the additive is trimethoxysilane that becomes a dimethoxysilane having at least one methoxy that reacts with an OH group to chemically bind the silane to the nanomaterial surface.

5. The method of claim 1, wherein the additive is trimethoxysilane that has an R group attached, wherein the R group is chosen from the group an alkane, an aromatic, and a vinyl group.

6. The method of claim 1 wherein the glass transition temperature of the polystyrene composite is at least 5° C. above the glass transition temperature of the polystyrene based polymer without the treated nanoparticle.

7. The method of claim 1, wherein the nanoparticles increase the glass transition temperature of the polystyrene composite to temperatures of at least 115° C.

8. The method of claim 1, wherein the nanoparticles increase the Vicat of the polystyrene composite.

9. The method of claim 1, wherein the nanoparticles increase the heat stability of the polystyrene composite.

10. The method of claim 1, wherein the additive increases the surface area of the nanoparticle by amounts of at least 5%.

11. The method of claim 1, wherein the nanoparticle is selected from the group consisting of alumina and combinations of silica and alumina.

12. The method of claim 1, wherein the treated nanoparticle is present in the polystyrene composite in an amount ranging from 0.001 wt. % to 50 wt. % based on a total weight of the polystyrene composite.

13. The method of claim 1, wherein polystyrene is present in the polystyrene composite in an amount ranging from 50 wt. % to 99.9 wt. % based on a total weight of the polystyrene composite.

14. The method of claim 1, wherein the additive is present in an amount ranging from 0.001 wt. % to 50 wt. % based on a total weight of the treated nanoparticles.

15. A method for production of a polystyrene composite, comprising:
   combining a styrene monomer with a treated nanoparticle to form a mixture and subjecting the mixture to polymerization conditions to produce a polystyrene composite;
   wherein the treated nanoparticle has been formed by contacting a nanoparticle with an additive to produce a treated nanoparticle prior to combining with the monomer;
   wherein the nanoparticle is selected from the group consisting of silica, alumina, and combinations thereof capable of adsorbing volatile components from the polystyrene composite;
   wherein the additive comprises a moiety that is capable of reacting with styrene from the polystyrene composite;
   wherein the glass transition temperature of the polystyrene composite is at least 2° C. above the glass transition temperature of the polystyrene based polymer without the treated nanoparticle; and
   wherein the polystyrene composite comprises a thermoplastic material in an amount ranging from 0.1 wt. % to 50 wt. %.

16. The method of claim 15, wherein the treated nanoparticle is dispersed within a polystyrene matrix of the polystyrene composite and comprises delaminated layered particles or particulates distributed within the polystyrene matrix.

17. The method of claim 15, wherein the additive comprises a silane moiety.

18. The method of claim 15, wherein the additive is:
   an alkoxysilane compound that has an R group attached, wherein the R group is chosen from the group an alkane, an aromatic, and a vinyl group;
   trimethoxysilane that becomes a dimethoxysilane having at least one methoxy that reacts with an OH group to chemically bind the silane to the nanomaterial surface; or
   trimethoxysilane that has an R group attached, wherein the R group is chosen from the group an alkane, an aromatic, and a vinyl group.

19. The method of claim 15, wherein the treated nanoparticle is dispersed within a polystyrene matrix of the polystyrene composite and comprises delaminated layered particles or particulates distributed within the polystyrene matrix.

20. The method of claim 19, wherein the polystyrene composite has an intercalated morphology, an exfoliated morphology, or combinations thereof.

21. The method of claim 15, wherein the nanoparticle is selected from the group consisting of alumina and combinations of silica and alumina.

22. A method for production of a polystyrene composite, comprising:
   combining a styrene monomer with a treated nanoparticle to form a mixture; and subjecting the mixture to polymerization conditions to produce a polystyrene composite;
   wherein the treated nanoparticle has been formed by contacting a nanoparticle with an additive to produce a treated nanoparticle prior to combining with the monomer;
   wherein the nanoparticle is selected from the group consisting of silica, alumina, and combinations thereof capable of adsorbing volatile components from the polystyrene composite;

wherein the additive comprises a moiety that is capable of reacting with styrene from the polystyrene composite;

wherein the glass transition temperature of the polystyrene composite is at least 2° C. above the glass transition temperature of the polystyrene based polymer without the treated nanoparticle; and wherein the polystyrene composite comprises a elastomeric phase in an amount ranging from 0.1 wt. % to 50 wt. %.

23. The method of claim 22, wherein the additive comprises a silane moiety.

24. The method of claim 22, wherein the additive is:

an alkoxysilane compound that has an R group attached, wherein the R group is chosen from the group an alkane, an aromatic, and a vinyl group;

trimethoxysilane that becomes a dimethoxysilane having at least one methoxy that reacts with an OH group to chemically bind the silane to the nanomaterial surface; or trimethoxysilane that has an R group attached, wherein the R group is chosen from the group an alkane, an aromatic, and a vinyl group.

25. The method of claim 22, wherein the treated nanoparticle is dispersed within a polystyrene matrix of the polystyrene composite and comprises delaminated layered particles or particulates distributed within the polystyrene matrix.

26. The method of claim 25, wherein the polystyrene composite has an intercalated morphology, an exfoliated morphology, or combinations thereof.

27. The method of claim 22, wherein the nanoparticle is selected from the group consisting of alumina and combinations of silica and alumina.

28. A method for production of a polystyrene composite, comprising:

combining a polystyrene with a treated nanoparticle to form a polystyrene composite;

wherein the treated nanoparticle has been formed by contacting a nanoparticle with an additive to produce a treated nanoparticle prior to combining with the polystyrene;

wherein the nanoparticle is selected from the group consisting of silica, alumina, and combinations thereof capable of adsorbing volatile components from the polystyrene composite; and wherein the additive comprises a moiety that is capable of reacting with styrene from the polystyrene composite.

29. The method of claim 28, wherein the additive comprises a silane moiety.

30. The method of claim 28, wherein the additive is:

an alkoxysilane compound that has an R group attached, wherein the R group is chosen from the group an alkane, an aromatic, and a vinyl group;

trimethoxysilane that becomes a dimethoxysilane having at least one methoxy that reacts with an OH group to chemically bind the silane to the nanomaterial surface; or trimethoxysilane that has an R group attached, wherein the R group is chosen from the group an alkane, an aromatic, and a vinyl group.

31. The method of claim 28, wherein the treated nanoparticle is dispersed within a polystyrene matrix of the polystyrene composite and comprises delaminated layered particles or particulates distributed within the polystyrene matrix.

32. The method of claim 31, wherein the polystyrene composite has an intercalated morphology, an exfoliated morphology, or combinations thereof.

33. The method of claim 28, wherein the polystyrene composite comprises a thermoplastic material in an amount ranging from 0.1 wt. % to 50 wt. %.

34. The method of claim 28, wherein the polystyrene composite comprises a elastomeric phase in an amount ranging from 0.1 wt. % to 50 wt. %.

35. The method of claim 28, wherein the nanoparticle is selected from the group consisting of alumina and combinations of silica and alumina.

* * * * *